(12) United States Patent
Cochran et al.

(10) Patent No.: US 10,882,675 B2
(45) Date of Patent: Jan. 5, 2021

(54) COOKWARE AND COOK-PACKS FOR NARROWBAND IRRADIATION COOKING AND SYSTEMS AND METHODS THEREOF

(71) Applicants:Don W. Cochran, Gates Mills, OH (US); Jonathan M. Katz, Solon, OH (US); Benjamin D. Johnson, Northfield, OH (US)

(72) Inventors: Don W. Cochran, Gates Mills, OH (US); Jonathan M. Katz, Solon, OH (US); Benjamin D. Johnson, Northfield, OH (US)

(73) Assignee: Pressco IP LLC, Cleveland, OH (US)

( * ) Notice: Subject to any disclaimer, the term of this patent is extended or adjusted under 35 U.S.C. 154(b) by 477 days.

(21) Appl. No.: 15/172,611

(22) Filed: Jun. 3, 2016

(65) Prior Publication Data
US 2016/0297585 A1 Oct. 13, 2016

Related U.S. Application Data

(63) Continuation of application No. 13/159,380, filed on Jun. 13, 2011, now Pat. No. 9,357,877.

(Continued)

(51) Int. Cl.
| | | |
|---|---|---|
| *A47J 37/01* | (2006.01) | |
| *F24C 15/24* | (2006.01) | |
| *H05B 3/10* | (2006.01) | |
| *B65D 65/20* | (2006.01) | |
| *A47J 36/04* | (2006.01) | |
| *A47J 36/02* | (2006.01) | |
| *H05B 3/14* | (2006.01) | |
| *H05B 3/00* | (2006.01) | |
| *A47J 37/06* | (2006.01) | |
| *B65B 25/22* | (2006.01) | |

(Continued)

(52) U.S. Cl.
CPC .............. *B65D 65/20* (2013.01); *A47J 36/02* (2013.01); *A47J 36/04* (2013.01); *A47J 37/01* (2013.01); *A47J 37/0623* (2013.01); *B65B 25/22* (2013.01); *B65D 65/42* (2013.01); *B65D 81/343* (2013.01); *H05B 3/0076* (2013.01); *H05B 3/148* (2013.01); *F24C 7/06* (2013.01); *F24C 7/087* (2013.01)

(58) Field of Classification Search
None
See application file for complete search history.

(56) References Cited

U.S. PATENT DOCUMENTS

| | | |
|---|---|---|
| 953,128 A | 3/1910 | Eskildson |
| 1,961,391 A | 6/1934 | Reedy et al. |

(Continued)

FOREIGN PATENT DOCUMENTS

| | | |
|---|---|---|
| DE | 101 47 664 A1 | 4/2003 |
| EP | 0 895 719 A1 | 2/1999 |

(Continued)

*Primary Examiner* — Joseph M. Pelham
(74) *Attorney, Agent, or Firm* — Fay Sharpe LLP

(57) ABSTRACT

A methodology and product or system configurations are provided which allow food to be directly irradiated for cooking applications which involve the impingement of direct radiant energy on food or comestible items. Cooking vessels or cook-packs are used that are optically transmissive in visible or infrared narrow wavelength bands emitted in suitable narrowband cooking or heating systems.

22 Claims, 6 Drawing Sheets

Related U.S. Application Data

(60) Provisional application No. 61/353,782, filed on Jun. 11, 2010.

(51) Int. Cl.
  B65D 65/42 (2006.01)
  B65D 81/34 (2006.01)
  *F24C 7/08* (2006.01)
  *F24C 7/06* (2006.01)

(56) References Cited

U.S. PATENT DOCUMENTS

| | | |
|---|---|---|
| 2,864,932 A | 12/1958 | Forrer |
| 3,037,443 A | 6/1962 | Newkirk et al. |
| 3,215,539 A | 11/1965 | Landy |
| 3,304,406 A | 2/1967 | King |
| 3,456,579 A | 7/1969 | Woods |
| 3,547,661 A | 12/1970 | Stevenson |
| 3,601,582 A | 8/1971 | Boisfleury |
| 3,615,713 A | 10/1971 | Stevenson |
| 3,777,654 A | 12/1973 | Strathaus |
| 3,881,023 A | 4/1975 | Wilson |
| 3,936,626 A | 2/1976 | Moore |
| 3,941,044 A | 3/1976 | Goltsos |
| 4,009,042 A | 2/1977 | Rittler |
| 4,013,798 A * | 3/1977 | Goltsos .............. B65D 81/3453 219/729 |
| 4,018,612 A | 4/1977 | Chyung |
| 4,196,331 A | 4/1980 | Leveckis et al. |
| 4,731,251 A | 3/1988 | Jovanovic |
| 4,801,017 A | 1/1989 | Artusi |
| 4,859,822 A | 8/1989 | Ragusa et al. |
| 5,036,179 A | 7/1991 | Westerberg et al. |
| 5,053,594 A | 10/1991 | Thota et al. |
| 5,070,045 A | 12/1991 | Comte et al. |
| 5,147,068 A | 9/1992 | Wright |
| 5,321,232 A * | 6/1994 | Ogle .................. F24C 7/087 219/494 |
| 5,350,904 A | 9/1994 | Kemske et al. |
| 5,382,441 A | 1/1995 | Lentz et al. |
| 5,423,453 A | 6/1995 | Fritz |
| 5,504,311 A * | 4/1996 | DuBuis .............. H05B 6/6438 219/506 |
| 5,517,005 A | 5/1996 | Westerberg et al. |
| 5,665,259 A | 9/1997 | Westerberg |
| 5,695,669 A | 12/1997 | Westerberg |
| 5,736,713 A | 4/1998 | Westerberg |
| 5,883,362 A | 3/1999 | Pettibone et al. |
| 5,910,264 A | 6/1999 | Dauliach |
| 5,954,980 A | 9/1999 | Westerberg et al. |
| 5,958,271 A | 9/1999 | Westerberg et al. |
| 5,994,677 A * | 11/1999 | Åkerlind ............ A47J 36/027 116/216 |
| 6,011,242 A | 1/2000 | Westerberg |
| 6,013,900 A | 1/2000 | Westerberg et al. |
| 6,018,144 A | 1/2000 | Vogt et al. |
| 6,018,146 A | 1/2000 | Uzgiris et al. |
| 6,057,528 A | 5/2000 | Cook |
| 6,069,345 A | 5/2000 | Westerberg |
| RE36,724 E | 6/2000 | Westerberg et al. |
| 6,080,436 A | 6/2000 | Lenahan |
| 6,106,761 A | 8/2000 | Sjoberg et al. |
| 6,176,175 B1 | 1/2001 | Moreth |
| 6,183,789 B1 | 2/2001 | Nilsson et al. |
| 6,204,492 B1 | 3/2001 | Zeng et al. |
| 6,348,676 B2 | 2/2002 | Kim et al. |
| 6,831,255 B1 | 12/2004 | Levi et al. |
| 6,849,830 B2 | 2/2005 | Damiano et al. |
| 7,019,271 B2 | 3/2006 | Wnek et al. |
| 7,141,770 B2 | 11/2006 | Zafiroglu et al. |
| 7,196,298 B2 * | 3/2007 | Åkerlind ............ H05B 6/6441 116/216 |
| 7,205,016 B2 | 4/2007 | Garwood |
| 7,319,213 B2 | 1/2008 | Tsontzidis et al. |
| 7,425,296 B2 | 9/2008 | Cochran et al. |
| 7,476,830 B2 | 1/2009 | Middleton et al. |
| 7,482,560 B2 | 1/2009 | Golden et al. |
| 7,723,655 B2 | 5/2010 | Kim |
| 7,862,318 B2 | 1/2011 | Middleton et al. |
| 8,029,893 B2 | 10/2011 | Siegel et al. |
| 8,053,047 B2 | 11/2011 | Siegel et al. |
| 8,481,893 B2 | 7/2013 | Rosenbloom et al. |
| 8,546,277 B2 | 10/2013 | Plantamura |
| 2003/0079613 A1 | 5/2003 | Williamson |
| 2003/0084047 A1 | 5/2003 | Williamson |
| 2003/0116561 A1 | 6/2003 | Shon et al. |
| 2004/0065658 A1 | 4/2004 | Damiano et al. |
| 2005/0279224 A1 | 12/2005 | Bergen |
| 2006/0118983 A1 * | 6/2006 | Cochran .............. B29B 13/023 264/40.6 |
| 2006/0157470 A1 * | 7/2006 | Cavada .................. F24C 7/082 219/411 |
| 2007/0007279 A1 | 1/2007 | Chun et al. |
| 2007/0029306 A1 | 2/2007 | Chun et al. |
| 2007/0096352 A1 | 5/2007 | Cochran et al. |
| 2008/0029503 A1 | 2/2008 | Cavada et al. |
| 2008/0047948 A1 | 2/2008 | Rosenbloom et al. |
| 2008/0110346 A1 | 5/2008 | Allesina |
| 2008/0118741 A1 | 5/2008 | Michalczyk et al. |
| 2008/0156804 A1 | 7/2008 | Bardou et al. |
| 2008/0206420 A1 | 8/2008 | McFadden |
| 2009/0188914 A1 | 7/2009 | Harl et al. |
| 2010/0015313 A1 | 1/2010 | Harris |
| 2010/0117819 A1 | 5/2010 | Murray |
| 2010/0221391 A1 | 9/2010 | Deng et al. |
| 2010/0320189 A1 | 12/2010 | Buchheit |
| 2011/0002675 A1 | 1/2011 | Cochran et al. |
| 2011/0002677 A1 | 1/2011 | Cochran et al. |
| 2011/0091614 A1 | 4/2011 | Malone et al. |
| 2011/0147374 A1 | 6/2011 | Obst et al. |
| 2011/0151083 A1 | 6/2011 | Soucy |
| 2012/0063753 A1 | 3/2012 | Cochran et al. |
| 2012/0163780 A1 | 6/2012 | De Luca |
| 2012/0228288 A1 | 9/2012 | Bouveret |
| 2012/0279895 A1 | 11/2012 | Middleton et al. |
| 2012/0319016 A1 * | 12/2012 | Kuhlman .............. F24C 7/04 250/505.1 |
| 2013/0202754 A1 * | 8/2013 | Cochran .............. A47J 36/02 426/383 |
| 2015/0185138 A1 * | 7/2015 | Richardson .......... G01N 21/251 356/402 |
| 2016/0195469 A1 * | 7/2016 | Manning .............. A47J 37/085 426/231 |
| 2017/0215233 A1 * | 7/2017 | Katz .................... F24C 7/046 |
| 2018/0220500 A1 * | 8/2018 | Staton .................. A47J 36/02 |

FOREIGN PATENT DOCUMENTS

| | | |
|---|---|---|
| JP | S-5781308 U | 5/1982 |
| JP | 58-43751 A | 3/1983 |
| JP | 59-167310 | 11/1984 |
| JP | 01-108940 A | 4/1989 |
| JP | 01-314518 A | 12/1989 |
| JP | H02-203123 A | 8/1990 |
| JP | 03-015422 A | 1/1991 |
| JP | H06-213462 A | 8/1994 |
| JP | 8-89398 A | 4/1996 |
| JP | 10-014776 A | 1/1998 |
| JP | 11-342083 A | 12/1999 |
| JP | 2000-023652 A | 1/2000 |
| JP | 2000-205573 A | 7/2000 |
| JP | 2001-027417 A | 1/2001 |
| JP | 2001161557 A | 6/2001 |
| JP | 2001-317741 A | 11/2001 |
| JP | 2002-147762 A | 5/2002 |
| JP | 2002-243161 A | 8/2002 |
| JP | 2004-195149 A | 7/2004 |
| JP | 2005-237464 A | 9/2005 |
| JP | 2006-317019 A | 11/2006 |
| JP | 2008-241617 A | 10/2008 |
| JP | 2008-258091 A | 10/2008 |
| JP | 2008295969 A | 12/2008 |

(56) References Cited

FOREIGN PATENT DOCUMENTS

| JP | 2012042145 A | 3/2012 |
| WO | WO 95/12962 A1 | 5/1995 |
| WO | WO 2009/032627 A2 | 3/2009 |

* cited by examiner

COOKWARE AND COOK-PACKS FOR NARROWBAND IRRADIATION COOKING AND SYSTEMS AND METHODS THEREOF

This application is a continuation of U.S. Ser. No. 13/159,380, filed Jun. 13, 2011, which application is incorporated herein by reference in its entirety and is based on and claims the benefit of and priority to U.S. Provisional Application No. 61/353,782, filed Jun. 11, 2010, which application is hereby incorporated herein by reference in its entirety.

BACKGROUND

The field of cooking, baking, re-thermalizing and other heat-related food preparation has had very few substantial or revolutionary changes in the last several decades. Therefore and correspondingly, the cooking ware vessels that are used for heat-related food preparation have changed very little. Vessels of cooking which include, but are not limited to, pots, pans, skillets, sauce pans, woks, casserole dishes, kettles, or griddles tend to be made of metals or ceramics—both of which are opaque to most wavelengths of irradiation. The packages or cook-packs in which pre-packaged foods are sold are often made from materials which also are optically opaque or nearly so. Therefore, any irradiation that would be directed at the comestibles would be blocked from direct impact by the cooking vessel or packaging. With this arrangement, since the radiant energy hits the cooking vessel and does not directly hit the food item, direct heating by the irradiation is not possible, at least from those angles which block direct photonic impact into the food item. As the irradiation energy hits the cooking vessel or package it is either reflected or absorbed by it. The result is it heats up the pan, cooking vessel, or package instead of directly heating the food. In order to heat the food, a secondary thermal transfer must take place between the cooking vessel or package and the comestible target. This is an inefficient heat transfer process in most cases, and since much of the produced heat never touches the comestible, there is a large percentage of wasted energy.

Secondarily, when the heat does finally reach the food item it must be conducted from the outer layer to the inner layers of the food product. This inherently causes the outer surface of the comestible to reach a much higher temperature than the innermost areas of the product. It also slows down the cooking process since there is a maximum speed at which heat can be conductively and/or convectively transferred from the outer surface to the inner region of the food product without burning, drying, or overheating it.

Microwave cooking, which does not use traditional broadband heat, but rather bombards the food with radio frequency energy, cooks entirely differently. Most non-metallic materials are transmissive to radio frequency electro-magnetic energy. It heats by exciting or spinning free polar molecules which then create heat inside the food. It is not transmitting radiant photons or hot air to the food item. By contrast, any kind of direct radiant cooking process has associated with it the challenge of how to suspend or hold the food item in the direct path of the irradiation source to facilitate the cooking process.

SUMMARY

In one aspect of the presently described embodiments, the vessel comprises a vessel location feature to locate the vessel in a position in the oven cavity relative to the arrays to facilitate irradiation of the comestible by the arrays, wherein the vessel is comprised of a material that is optically transmissive at the visible or infrared narrow wavelength bands of irradiation emitted by the irradiation arrays.

In another aspect of the presently described embodiments, the vessel is comprised of plastic material.

In another aspect of the presently described embodiments, the plastic material is at least one of polyethylene terephthalate (PET), polypropylene (PP), high density polyethylene (HDPE), low density polyethylene (LDPE), polyvinyl chloride (PVC), polystyrene (PS), post-consumer resin (PCR) or Nylon.

In another aspect of the presently described embodiments, the vessel includes selected sections that are optically transmissive to allow direct irradiation cooking of the comestible.

In another aspect of the presently described embodiments, the vessel is comprised of at least portions of glass material having a coefficient of thermal expansion of less than $6.0 \times 10^{-6}$.

In another aspect of the presently described embodiments, selected areas of the glass material are very thin.

In another aspect of the presently described embodiments, the vessel has a thinnest cross-section to allow for adequate structural strength for a geometry of the vessel to function.

In another aspect of the presently described embodiments, the material includes stress relievers.

In another aspect of the presently described embodiments, the material is tempered glass or glass designed for toughness.

In another aspect of the presently described embodiments, the material is borosilicate glass.

In another aspect of the presently described embodiments, the material includes colorants such that the colorants are chosen to be optically transparent at the chosen wavelengths.

In another aspect of the presently described embodiments, the material includes additives to raise a coefficient of absorption.

In another aspect of the presently described embodiments, the vessel further comprises an anti-reflective coating.

In another aspect of the presently described embodiments, the vessel further comprises codes specifying at least one of cooking parameters or oven configuration parameters corresponding to physical parameters of the vessel.

In another aspect of the presently described embodiments, the codes are one-dimensional or two-dimensional bar codes.

In another aspect of the presently described embodiments, the codes are radio frequency identification (RFID) tags.

In another aspect of the presently described embodiments, the vessel location feature comprises a shoulder positioned on the outside of the vessel, the shoulder being configured to mate with a portion of the oven cavity to hold and locate the vessel within the oven cavity.

In another aspect of the presently described embodiments, the vessel further comprises a comestible guide feature to orient the comestible relative to the arrays.

In another aspect of the presently described embodiments, the comestible guide feature comprises graphical or geometric indicators.

In another aspect of the presently described embodiments, the graphical or geometric indicators are disposed on or formed in a surface of the vessel.

In another aspect of the presently described embodiments, the vessel further comprises a cover, the cover being optically transmissive at least one of the visible or infrared narrow wavelength bands of irradiation emitted by the irradiation arrays.

In another aspect of the presently described embodiments, the vessel is configured to facilitate irradiation of the comestible from top and bottom directions.

In another aspect of the presently described embodiments, the vessel is comprised of mesh material.

In another aspect of the presently described embodiments, the cook-pack comprises a plastic base portion into which the comestible item is placed, the plastic base portion being optically transmissive at the visible or infrared narrow wavelength bands of irradiation emitted by the irradiation arrays to facilitate heating the comestible by the irradiation emitted by the arrays, and a cover for the base portion.

In another aspect of the presently described embodiments, the cover is comprised of a material that is optically transmissive at least one of the visible or infrared narrow wavelength bands of irradiation emitted by the irradiation arrays.

In another aspect of the presently described embodiments, the cover is one of a lid and a film.

In another aspect of the presently described embodiments, the cook-pack is comprised of at least one of polyethylene terephthalate (PET), polypropylene (PP), high density polyethylene (HDPE), low density polyethylene (LDPE), polyvinyl chloride (PVC), polystyrene (PS), post-consumer resin (PCR) or Nylon.

In another aspect of the presently described embodiments, at least one of the plastic base portion and the cover includes at least one colorant, the at least one colorant being optically transmissive in at least one of the narrow wavelength bands of irradiation.

In another aspect of the presently described embodiments, at least one of the plastic base portion and the cover includes additives to raise a coefficient of absorption.

In another aspect of the presently described embodiments, the cook-pack further comprises an anti-reflective coating.

In another aspect of the presently described embodiments, the cook-pack further comprises codes specifying at least one of cooking parameters or oven configuration parameters specific to the comestible in the cook-pack.

In another aspect of the presently described embodiments, the codes are one-dimensional or two-dimensional bar codes.

In another aspect of the presently described embodiments, the codes are radio frequency identification (RFID) tags.

In another aspect of the presently described embodiments, the cook-pack further comprises a pressure or steam relief valve.

In another aspect of the presently described embodiments, the cook-pack further comprises geometric shapes of different material for browning or branding purposes.

In another aspect of the presently described embodiments, the cook-pack further comprises a vessel location feature to locate the vessel in a predetermined position in the oven cavity relative to the arrays.

In another aspect of the presently described embodiments, the vessel location feature comprises a shoulder positioned on the outside of the vessel, the shoulder being configured to mate with a portion of the oven cavity to hold and locate the vessel within the oven cavity.

In another aspect of the presently described embodiments, the cook-pack is configured to facilitate irradiation of the comestible from top and bottom directions.

In another aspect of the presently described embodiments, the base portion is one of a disc and a container with vertical walls.

In another aspect of the presently described embodiments, the base portion includes at least one of ribs and apertures.

In another aspect of the presently described embodiments, the at least one colorant causes the vessel to be at least partially opaque to a human viewer while maintaining high transmissivity in at least one of the narrow wavelength bands of visible or infrared radiation.

In another aspect of the presently described embodiments, the at least one colorant comprises inks or colorants used as labeling material readable by a human viewer while maintaining high transmissivity in at least one of the narrow wavelength bands of visible or infrared radiation.

In another aspect of the presently described embodiments, the method comprises positioning the comestible in a vessel, the vessel being comprised of a material that is optically transmissive in at least one of the visible or infrared narrow wavelength bands of irradiation emitted by the irradiation arrays, positioning the vessel in the oven cavity using a vessel location feature to locate the vessel in a predetermined position in the oven cavity relative to the arrays, and, heating the comestible in the vessel with irradiation emitted by the irradiation arrays.

In another aspect of the presently described embodiments, positioning the comestible in the vessel comprises using a comestible guide feature to orient the comestible.

In another aspect of the presently described embodiments, the comestible guide feature comprises graphical indicators or geometric features on a bottom of the vessel.

In another aspect of the presently described embodiments, the vessel location feature comprises a shoulder positioned on the outside of the vessel, the shoulder being configured to mate with a portion of the oven cavity to hold and locate the vessel within the oven cavity.

In another aspect of the presently described embodiments, positioning the vessel in the oven cavity using a vessel location feature to locate the vessel in a predetermined position in the oven cavity relative to the arrays comprises the vessel mating with a support structure built into or attached to an inside of the oven cavity such that the support structure supports the vessel having a comestible therein in a correct cooking position.

In another aspect of the presently described embodiments, the method comprises selecting a plastic vessel or cook-pack which is configured to have at least one area which functions as a base portion, the plastic base portion being optically transmissive in at least one of the visible or infrared narrow wavelength bands of irradiation emitted by the irradiation arrays, placing the comestible in the base portion, and enclosing the comestible in the base portion.

In another aspect of the presently described embodiments, the enclosing comprises one of positioning a cover on the base portion, applying a film over the base portion, and placing the base portion in a container.

In another aspect of the presently described embodiments, the method further comprises providing codes for identifying parameters associated with the cook-pack or the comestible.

In another aspect of the presently described embodiments, the method further comprises choosing a material for the plastic vessel or cook-pack and forming the plastic vessel or cook-pack.

In another aspect of the presently described embodiments, the selecting comprises selecting a plastic vessel or cook-pack having colorants therein.

In another aspect of the presently described embodiments, the method further comprises providing the vessel or cook-pack to a user to heat or cook the comestible in the oven cavity.

In another aspect of the presently described embodiments, the apparatus comprises a first portion formed of perforated or mesh material, a second portion formed of the perforated or mesh material, the first and second portions being hinged to facilitate placement of the comestible between the first and second portions, and, an apparatus location feature to locate the apparatus in a predetermined orientation in the oven cavity relative to the arrays to facilitate irradiation of the comestible by the arrays.

In another aspect of the presently described embodiments, the predetermined orientation in the oven cavity is vertical such that a largest plane of the comestible is approximately vertical.

In another aspect of the presently described embodiments, the apparatus location feature facilitates rotation or oscillation of the apparatus in the oven cavity.

In another aspect of the presently described embodiments, the system comprises the oven cavity having irradiation arrays that emit visible or infrared irradiation at only desired narrow wavelength bands, a vessel for supporting the comestible, a vessel location feature to locate the vessel in a position in the oven cavity relative to the arrays to facilitate irradiation of the comestible by the arrays, wherein the vessel is comprised of a material that is optically transmissive at the visible or infrared narrow wavelength bands of irradiation emitted by the irradiation arrays.

BRIEF DESCRIPTION OF DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1A:
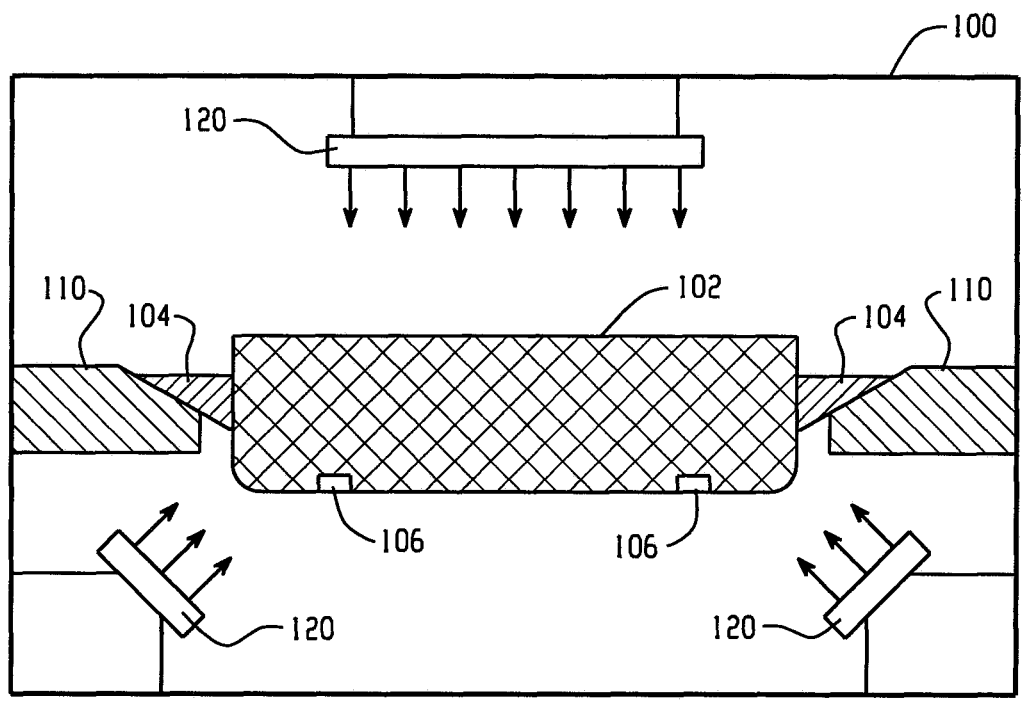
FIGS. 1(a) and (b) show illustrations of example vessels according to the presently described embodiments.

The presently described embodiments therefore teach and describe a methodology and product or system configurations which allow food or comestible items to be directly irradiated for cooking applications which involve the impingement of direct radiant energy on food or comestible items. Of course, for any given heating or cooking application, reference to a comestible or comestible item herein indicates or means or encompasses a single item or multiple items for ease of explanation. Direct radiant cooking applications generally divide into two broad classifications.

The first, which has been around for many of years, is characterized by various forms of broadband irradiation sources. Most traditional cooking technologies ranging through wood and coal fires, gas burners, resistive heating elements, quartz halogen bulbs, and others, do not employ those modalities to directly irradiate the comestible food target. They typically heat the air in the oven cavity or cooking region and it, in turn, heats and cooks the food item. Sometimes, but not typically, those modalities are used as direct radiant heating sources and cook the food through the absorption of the direct photonic energy therefrom. All of these irradiation sources are characterized by having a radiation output which is broader than several hundred nanometers in overall bandwidth, full-width at the 10% off full energy point. In fact, usually these broadband sources have a bandwidth of thousands of nanometers. They are therefore referred to as broadband irradiation sources and cooking systems.

The second broad category is new to the cooking world. In general, it is characterized by employing a very narrow bandwidth of output irradiation energy which wavelength is thoughtfully matched to the cooking application in order to have the desired cooking effect on the food. It is beyond the scope of this invention to describe the full range of narrowband direct irradiation cooking technology which is also known as Digital Heat Injection (DHI) technology. It is, however, described in-depth in at least U.S. Pat. No. 7,425, 296 and U.S. application Ser. No. 12/718,899 (filed Mar. 5, 2010—and claiming priority to U.S. Provisional Application No. 61/157,799, filed Mar. 5, 2009—and which is a continuation-in-part of U.S. application Ser. No. 11/351,030, which is a continuation of U.S. application Ser. No. 11/003, 679), U.S. application Ser. No. 11/448,630 filed Jun. 7, 2006, and U.S. application Ser. No. 12/718,919 (filed Mar. 5, 2010—and claiming priority to U.S. Provisional Application No. 61/224,765, filed Jul. 10, 2009 and U.S. Provisional Application No. 61/157,799, filed Mar. 5, 2009), all of which are incorporated herein by reference.

The presently described embodiments teach novel technology and methodology for cookware and related systems which are designed to function properly with direct narrowband irradiation cooking. The novel innovations describe the techniques, systems and methods for designing and implementing cookware and cook-packs that facilitate allowing the direct photonic energy to impact the food target(s) or comestible item(s) that will be cooked. In at least one form, the narrow wavelength bands of irradiation match desires absorptive characteristics of the comestible being heated or cooked. The presently described embodiments detail cookware and cook-packs (and/or related systems) which are properly designed to be either nonblocking or transmissive to the extent desirable for various types of cooking and food warming. The following paragraphs describe and detail a wide range of aspects as to the subject embodiments.

Fundamentally, a cookware or cook-pack product made according to the presently described embodiments must allow appropriate and adequate transmission of the photonic energy (e.g. in the visible or infrared ranges) to the food target that comes from the irradiation sources that are incorporated in the narrowband cooking system. Again, in at least one form, the contemplated narrow wavelength bands of irradiation emitted toward the comestible by the arrays match desired absorptive characteristics of the comestible being heated or cooked. There are a number of ways of allowing the direct irradiation to have the appropriate direct access to the comestible item.

The first way is to use a cookware vessel which has adequate openings and spaces surrounding the food such that the irradiation can impact the food directly. It is easy to provide open access to the irradiation from above by using an open, uncovered style of cookware such as a traditional skillet. In many cases, an important aspect comes, however, with providing the direct irradiation access from the bottom or sides. By manufacturing the cookware out of a mesh, woven, or perforated material, it is possible to provide substantial direct access to the food from the bottom or side irradiation. Ideally, there should be a high ratio of opening compared to solid material to maximize the direct access. While many different materials could be used, a very fine gauge copper screening material which has a large amount of space between the wires could be an especially advantageous material from which to make a cooking grate or a cooking basket. While it is possible to imagine many types and kinds of manufacturing methods which create a high percentage of opening to the bottom and sides, this design has some major drawbacks. Perhaps the biggest drawback is the fact that it will not contain juice, blood, sauce, or other liquids related to the food cooking. However, if these are not important to a particular application, then it may well be an ideal way of "suspending" the comestible in an irradiatable position relative to the irradiation sources. Further, narrowband cooking does not require the use of associated liquids or sauces in order to maintain a moist and tasty food product. Therefore, to implement this type of narrowband cookware, it would be desirable to move the irradiation sources so that they are not directly in the gravitational drip path of the food item. If the irradiation is accomplished from the side or at an angle so that the drips cannot land on the irradiation sources, it is a much superior design.

With reference to FIG. 1(a), an oven cavity 100 is shown. Within the oven cavity 100, which includes irradiation arrays 120 positioned in exemplary positions as described above and (in operation) emitting narrow wavelength bands of irradiating suitable for cooking or heating as described herein (including as described in connection with FIG. 2), is suspended a basket or vessel 102 formed of, for example, very fine gauge copper screening material noted above. Of course, any suitable material (including plastic or other material that may form part of the cook-pack or packaging of the comestible) may be used. The bracket or vessel may take a variety of forms, including a form having separations for separating items within. Also shown are vessel locating features 104 that mate with shoulder portions 110 of the oven cavity. The vessel locating features 104 may take a variety of forms, are useful for positioning the vessel in a selected or suitable position relative to the arrays to facilitate irradiation of the comestible and may be formed of a variety of materials suitable for use in the oven cavity 100. In one form, the vessel locating features are lugs or extensions that mate with corresponding portions of the oven cavity to facilitate appropriate orientation and position of the vessel in the oven cavity. Comestible guide features 106, although not required, are also included in this example to provide a guide for users when placing the comestible in the vessel. The guide features 106 likewise are useful for positioning the comestible relative to the arrays to facilitate irradiation of the comestible, and may be formed (or placed or otherwise disposed) on, in, or within the mesh material of, the vessel 102.

It is also possible to use this mesh style of cookware to squeeze foods from both sides so that irradiation in another direction such as horizontal is possible. For example, a steak could be sandwiched between two copper mesh sheets and irradiated horizontally with the large plane of the steak being vertical. With this configuration, all dripping and juice could fall into a drip trough straight below the food without disturbing or contaminating the direct irradiation sources.

Figure 1B:
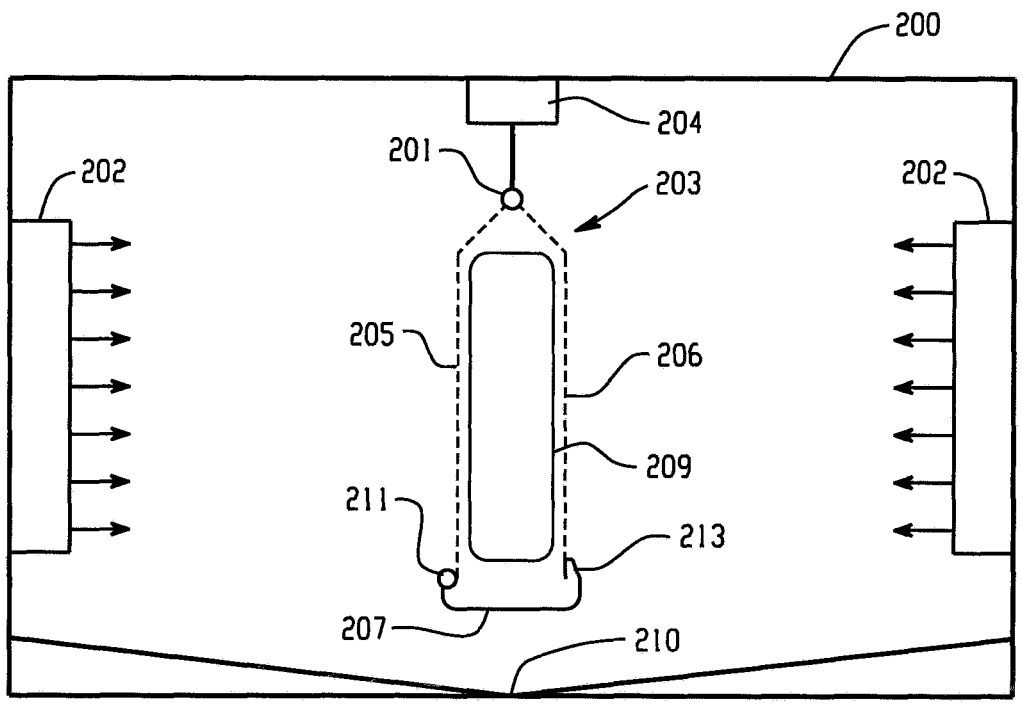

With reference to FIG. 1(b), an oven cavity 200 is shown. Within the oven cavity 200, which includes irradiation arrays 202 positioned in exemplary positions as described above for operation as described herein, is suspended an alternative vessel such as a mesh device 203 formed of, for example, very fine gauge copper screening material noted above. In this regard, mesh sheets 205 and 206 sandwich the comestible 209 (e.g. a steak) for cooking. The sheets 205 and 206 may be connected at one end with a variety of mechanisms; however, in one form, a hinge mechanism 201 is used. The sheets 205 and 206 are connected at an open end to maintain the comestible 209 therebetween by a clip 207, although a variety of mechanisms or techniques may be used to do so. The clip 207 is hinged at hinge 211 and clips or locks to an opposite side of the mesh device at 213 by any of a variety of mechanisms including a clip, friction fit, lock, . . . etc. Also shown is attachment or location feature 204 from which the device 203 hangs. The attachment 204 may take a variety of forms, including the form of a manual, motorized or automated device to oscillate or rotate the device 203. A trough 210, for collecting the drippings from the comestible, is also shown. Also, as shown, the largest plane of the comestible is approximately vertical relative to the bottom of the oven cavity and facing the arrays or the respective sides.

A more technically sophisticated way of practicing the presently described embodiments employs materials that are engineered to be optically transmissive or transparent at the narrowband wavelengths that will be used for the cooking operation. Again, in at least one form, the contemplated narrow wavelength bands of irradiation emitted toward the comestible by the arrays match desired absorptive characteristics of the comestible being heated or cooked. In order to fully understand and implement this technology, it is necessary to discuss some fundamentals of both narrowband cooking and the transmissive characteristics of various materials from which the cookware or cook-packs could be constructed.

As was discussed above, traditional cooking has been performed with broadband sources from the beginning of history. The recent innovation of narrowband cooking, which is sometimes known as Digital Heat Injection or DHI, employs an entirely different kind of direct irradiation sources. Although there are theoretically many different types of narrowband irradiation sources, an advantageous group of these sources include solid-state, semiconductor devices that produce the narrowband energy directly in, for example, the visible and/or infrared ranges. Depending on which technology is employed, the full width, at half-maximum bandwidth of the irradiation will typically be less than a few hundred nanometers in width. Other popular sources may be less than 50 nanometers in overall bandwidth, and the current best practice will typically employ sources which are less than 10 nanometers in width and even as low as one nanometer in width. These contemporary, narrowband direct irradiation cooking sources interact very differently with the various types of transmissive materials than broadband sources.

The vessels and cook-packs contemplated by the presently described embodiments, in at least on form, are optically transmissive or transparent at the visible or infrared narrow wavelength bands of irradiation that are emitted by the irradiation arrays. In this regard, as an example, these items have high transparency (e.g. 95% transparency or greater, or even greater than 98% transparency) in the appropriate wavelength bands. All materials out of which cooking vessels or cook-packs could be manufactured that are transmissive to photonic energy have a characteristic absorption signature. The signature shows how much absorption that material exhibits at every wavelength that may be relevant. Such a curve can be produced from the ultraviolet range through the visible range and on through the near infrared range to the mid-infrared range and the long infrared range. Many materials have highly transmissive windows in the near infrared and shortwave infrared regions where they are highly transmissive. They will typically have other windows where the material is highly absorptive. As irradiation photons try to pass through a material at a wavelength at which it is highly transmissive, there is very little heating of the base material and most of the energy will indeed pass right on through it. On the other hand, as that amount of photonic irradiation energy is directed through at a wavelength at which the material is highly absorptive, a large percentage of that energy will be absorbed and turned into heat in the material while very little, if any, is actually transmitted through and out the backside of the material. As the photonic energy enters the material at a particular wavelength, that energy is converted to heat and extinguished at an exponential rate depending on the absorption coefficient of that material at that wavelength. The amount of absorption or transmission can be calculated for any given material and must be calculated as a function of its thickness. Thicker materials have a longer path length through which to absorb the photonic energy and for any given wavelength will necessarily produce more conversion of photonic energy into heat during its transmission pass. Accordingly, in at least one form, the vessel or cook-pack has a thin cross-section or profile, e.g. the thinnest cross-section or profile that will allow adequate structural integrity or strength for the geometry of the vessel to function properly. In some cases, for example, the thickness of the material could be as thin as 1 mil, but more practically is about 5-10 mils to maintain an appropriate blend of strength, integrity and transmissiveness (e.g. for plastic material). Approximately 3 mm thickness may suffice for other materials such as glass material.

It will also be understood that the vessel or cook-pack may be provided with only selected portions that are optically transmissive or transparent at the appropriate wavelengths to allow direct irradiant cooking of a comestible in the vessel or cook-pack. In at least one form, these selected portions are designed to be very thin in profile or cross-section to enhance transmissive properties.

Thus, as we choose a material out of which to manufacture a cookware or cook-pack for use with narrowband cooking or warming, we should do it with the material properties in mind. For example, if we are evaluating a plastic material for use in a cook-pack, the transmission/absorption characteristics at the wavelength or wavelengths that will be used would be important, but the melting temperature and the "softening" or glass transition temperature would also be important. The container, in at least one form, maintains enough structural integrity to complete the cooking process. Of course, it should be understood that the cook-pack will generally store the comestible and serve as the container or vessel in which the comestible will be heated or cooked according to the present application. In this regard, it will be appreciated that bidirectional stretching of some materials, such as PET material, generally provides improved structural integrity or strength while providing a thinner profile for the material. It will also be appreciated that a thinner profile generally improves optical transmissiveness. Also, in at least one form, the vessel or cook-pack does not give off any deleterious compounds at the temperatures and irradiation intensities that will be utilized.

As a specific example, a strong candidate material in which to package a frozen food to be cooked with DHI would be PET or polyethylene terephthalate. PET has an advantageous transmission window where the coefficient of absorption is very low at only about 0.027 in the near IR between about 800 nanometers and about 1,000 nanometers. Also, there is very little absorption at any wavelength up to about 1,600 nanometers, except for a slightly absorptive region around 1,415 nanometers. PET's glass transition temperature starts at about 185° F. and its melting temperature is well above 450° F. It is currently used in industry for hot fill liquids at roughly 200° F.

Other types of plastic material may also be used for the vessels or cook-packs. For example, polypropylene (PP), high density polyethylene (HDPE), low density polyethylene (LDPE), polyvinyl chloride (PVC), polystyrene (PS), post-consumer resin (PCR) or Nylon may form the vessels or cook-packs.

Glass is a material that also has a large transmission window spanning from visible through the mid-infrared region. Most of the glass cookware that is readily available on the market today is not properly suitable for narrowband cooking use. The narrowband semiconductor irradiation devices such as lasers and LEDs can produce highly concentrated energy in small localized areas, which standard sodium lime or other typical glass cookware cannot tolerate. The well-engineered narrowband cookware must have a low thermal coefficient of expansion. Borosilicate glass has such a low coefficient of thermal expansion that it will survive well with DHI cooking. According to the presently described embodiments, it is recommended that narrowband glass cookware should have a coefficient of thermal expansion of less than $6.0 \times 10^{-6}$. Ideal glass cookware, according to the presently described embodiments, should also have a thin cross section so that there will be less heating of the glass itself because of the shorter photonic path, and it may be stress relieved and tempered as part of its processing. The selected material (e.g. glass or tempered glass), in at least one form, is designed for toughness in terms of an appropriate strength, structural integrity and transmissivity.

The question may come up as to whether the example glass or plastic material, such as the PET material, should be visibly clear. Another feature of the present invention is that it does not have to be visibly clear material in order to be a proper narrowband cookware or cook-pack product. Many colorants that are used are only absorptive in their respective range in the visible wavelengths of light. While the entire visible wavelength range spans from about 400 nanometers to about 750 nanometers, the effect of any given colorant is typically a small subset of that overall range. Often, however, broadband absorbers are used as colorants such as titanium dioxide and carbon, which would not be suitable for use with narrowband cooking because they do not have any highly transmissive windows in the near infrared and short infrared ranges that are relevant. There are many colorants available that are limited in their absorption to a subset of the visible wavelength range or slightly above.

The beauty of this concept is that beautiful and desirable colors can be used for the packaging or cookware with absolutely no deleterious effect to the direct radiant cooking. Colorants could, therefore, be used in glass, plastic, and some ceramics to make for a very desirable consumer product. The colorants should simply be selected to have transmission windows that will allow the applied wavelengths to pass according to the application and heating preferences. That is, the colorants, in at least one form, are chosen to be optically transmissive or transparent at the chosen wavelengths that irradiate or cook the comestible. Also, the colorants, in at least one form, cause the vessel or cook-pack to be at least partially (which could include up to substantially or completely) opaque to a human viewer while maintaining high transmissivity in at least one of the narrow wavelength bands of irradiation used for cooking. Further, it should be appreciated that inks or colorants may be used on the vessels or cook-packs as labeling material that provides legibility by a human observer while maintaining high transmissivity in at least one of the narrow wavelength bands of irradiation used for cooking.

There will be applications for narrowband cookware and cook-packs which will be optimized with a slightly higher level of absorption in the cooking vessel. For example, an application that can better optimize the cooking if the cooking vessel itself is at a raised temperature. In order to accomplish this, an absorptive additive can be put in the material which will raise the coefficient of absorption at the desired wavelength. As was mentioned earlier, carbon black could be added in small amounts to appropriately increase the absorption of the cooking vessel itself.

Another aspect of the presently described embodiments involves using antireflective coatings on the cooking vessel or cook-pack for improved transmission matching. Such coatings can help to more nearly match the index of refraction when going from air into the cooking vessel material at a particular wavelength. Because narrowband cooking typically only involves one, two, or three very narrow wavelength bands, a coating can be designed which will match the index of refraction for each of the relevant wavelengths much better than a broadband coating that would try to match the whole range of broadband wavelengths. Since, with uncoated transparent materials, nearly five percent of the irradiation energy is reflected back at each surface as a Fresnal reflection, some increased performance can be accomplished by way of these index matching coatings. It should also be appreciated that the coatings (if used) are formulated to be safe, not release deleterious substances into the food, and designed to pass FDA, UL and/or other regulatory agency regulations for food and food preparation safety.

Cook-packs that are intended for narrowband cooking applications can incorporate or have associated therewith special codes that may take a variety of forms including numerals (or other alphanumeric characters), markings, graphical indicators, . . . etc. that can be used for a variety of reasons including to automatically set up a narrowband oven system for optimal cooking. Such codes could be one or two dimensional codes, readable or visibly readable codes or could be invisible codes printed with UV florescent ink or IR florescent ink. These could be standard bar codes, one or two dimensional bar codes, matrix bar codes, or RFID codes, which communicate copious information to the oven for a variety of purposes. Also, for example, the codes may specify cooking parameters or oven configuration parameters specific to the food in the cook-pack. By using these codes, it would also be possible for the ovens to, for example, automatically read and communicate information that could help maintain inventory levels in a store or be tied in with a home automation system to keep track of pantry stock, dates, and other pertinent data. Of course, the cookware vessels noted above may also be provided with such codes specifying cooking parameters or oven configuration parameters corresponding, e.g., to the physical parameters of the vessel. Also, in either cookware or cook-pack implementations according to the presently described embodiments, the codes could be provided in association with a particular vessel, item of cookware, cook-pack or comestible in a variety of different manners including 1) placement on the vessel, item of cookware, cook-pack or comestible, 2) provision on packaging or the like, or 3) provision on or with associated documentation such as a receipt.

It should be understood that the code may be provided to the oven in a variety of manners. As mentioned above, for example, the oven could read the codes in appropriate manners by appropriate sensors or cameras and sent to a controller for the oven (such items not shown in FIGS. 1, 2 and 4 for east of illustration). Also, the codes could be input through an oven interface by the user (also not shown for ease of illustration).

Cook-packs could also include a pressure or steam relief valve integrated into the container, (e.g. in a base portion or a cover or lid) to prevent packaging from bursting or leaking when it is cooked with narrowband technology. Also, stripes (or other geometric shapes) of different materials could be added to the container to cause browning, branding or 'engraving' of name logos through, for example, contact heating with the different materials which may absorb higher amounts of irradiation and heat up. They could also facilitate special affects needed for multi-ingredient cooking.

Figure 2:
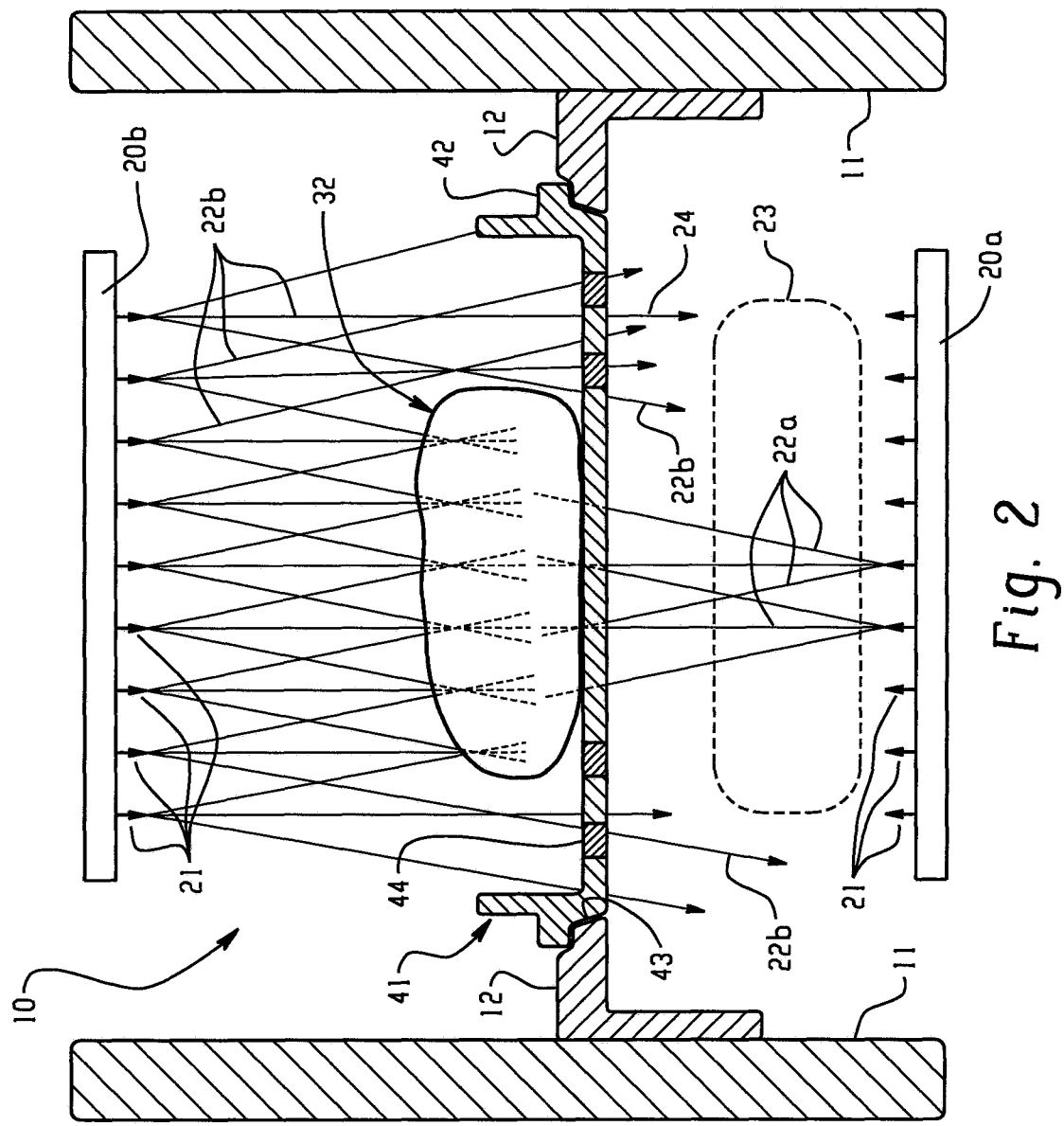
FIG. 2 is an illustration of an example vessel according to the presently described embodiments.

FIG. 2 shows an example of the presently described embodiments. It shows a system according to the presently described embodiments including an oven cooking cavity represented by the space 10 and bounded on two sides by a pair of oven walls 11. It shows a lower narrowband irradiation array 20*a* and an upper narrowband irradiation array 20*b*. The irradiation arrays are populated with, for example, surface emitting laser diode devices 21 which irradiate toward the food target item 32 with an irradiation pattern shown by the representative photonic vector lines 22 (e.g. 22*a* and 22*b*). These laser diode devices 21, in at least some forms, irradiate in narrow wavelength bands in the visible and/or infrared ranges, wherein the narrow wavelength bands match desired absorptive characteristics of the comestible for cooking/heating. The pattern of the irradiation devices 21 are only represented for concept by the lines 22 (e.g. 22*a* and 22*b*). A typical system would show an overlapping irradiation pattern emanating from the devices 21 so that there was no gap between the irradiation output of one device versus an adjacent device. A properly designed narrowband oven will arrange the fields of irradiation of the respective devices 21 so that they produce a reasonably homogeneous and overlapped irradiation field at the point of impact with the comestible target 32.

The comestible target 32 is sitting in a specially designed narrowband cookware vessel 41. The vessel 41 is formed according to the presently described embodiments (and may include any single feature, any combination of features, or all of the features described herein) and is shown in an oven cavity to illustrate a system according to the presently described embodiments. The narrowband cookware vessel 41 can be designed so that it has special location features such as the lower shoulders of the vessel 43 which can be used in conjunction of the support brackets or shoulder 12 to locate the vessel in the proper relationship to the irradiation arrays 20*a* and 20*b*. It is to be understood that the vessel 41 may take on a variety of configurations, including a configuration where compartments for separating items such as food items are provided. The illustrated vessel 41 is merely an example. Also, the brackets or shoulder 12 may take on different forms or be replaced with racks or other mechanisms, but, in at least one form, the different or replacement structures will facilitate positioning and orientation and be formed of material transmissive at appropriate wavelength bands so the comestible may be heated or cooked in accord with the presently described embodiments.

The narrowband cookware vessel 41 may have graphical or geometric indicators, such as concentric circles or other concentric markings, on its upper surface 44 to provide a guide so that the cook or operator of the narrowband oven system will place the comestible item in the proper location for irradiation cooking. Such markings on the surface 44 can either be on the surface or manufactured inside the thickness of the cookware 41. Whatever material or colorant that may be used to form such marking features should be appropriately transmissive at the wavelengths that are to be used in conjunction with the narrowband cooking. The markings can be configured in whatever manner will provide the proper queues to place the food targets properly in the cooking vessel. For most applications it will be appropriate to place the food items central in the cooking vessel but there may be applications or reasons why it is appropriate to place it other than centrally. One example would be where multiple different types of comestibles will be cooked in the same cooking vessel. The markings could be indicative of the correct location for each of the several different types of cooking targets. This can be used in conjunction with the narrowband oven to provide differing amounts of irradiation for each of the respective cooking items. The locations can correspond to different sections or sub-portions of the irradiation arrays, such as 20a or 20b, so that some of the irradiation devices 21 can be turned on and others turned off for a particular application. The program, could in fact, have programmable control of each different irradiation device 21 or groups or subsets thereof as may be determined by the narrowband irradiation system designer because of the flexibility required to do particular cooking operations. The markings 44 could actually take the form of being three dimensional above the surface of the cookware or cook-pack 41 such that there are actual physical spaces defined by the markings (such as, for example, compartments noted above) which make it easier to place the food in the appropriate locations for the irradiation cooking operation.

If the cooking vessel happens to be a cook-pack or formed of suitable material, the dividers 44 could be three dimensionally molded from the thin transmissive material in order to hold the comestibles in place while locating it appropriately to be irradiated by the narrowband cooking system. A bar code or RFID marking associated with a particular kind of pre-packaged food or dinner could contain all of the necessary locational information with respect to the marking 44 or dividers that may be molded into the transmissive package to automatically set up the control system to control the output of the arrays, such as 20a or 20b, in terms of which devices 21 are turned on at what strength at any given time during the cooking process.

The irradiation which would come from the array 20a from the individual devices 21 would have an irradiation pattern through the region 23 which is generally described at vertically upward toward the comestible target similarly to the way the irradiation pattern is formed by array 20b in the downward direction but the photonic vector lines have been left off for clarity in the drawing. Again, in at least one form, the contemplated narrow wavelength bands of irradiation emitted toward the comestible by the arrays match desired absorptive characteristics of the comestible being heated or cooked.

Figure 3:
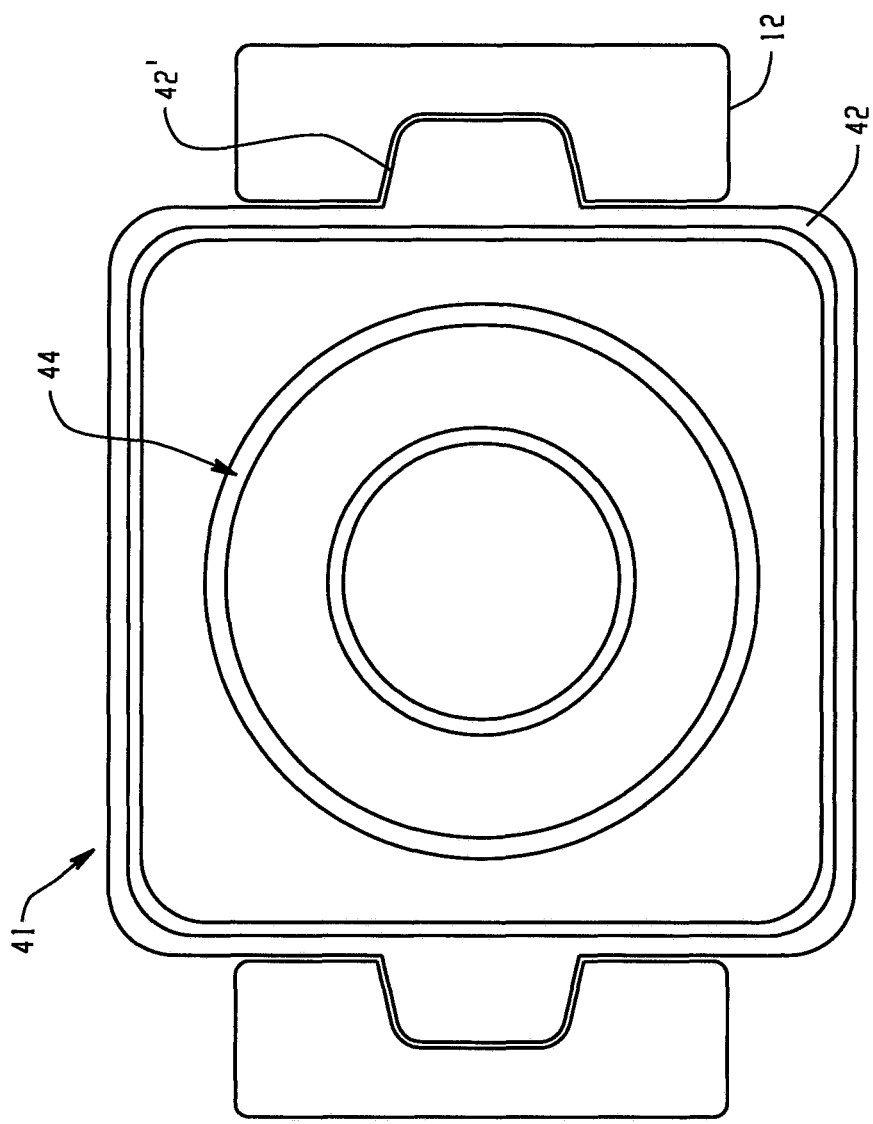
FIG. 3 is an illustration of an example vessel according to the presently described embodiments.

The cooking vessel 41 can be provided with lugs 42 which circumscribe part or all of the cooking vessel but for purposes of providing a locating lug on which the cooking vessel can rest on the brackets 12 to secure its position vertically in space. This is optional and with the variety of different configurations that could be imagined may be appropriate in some applications and unneeded in others. The locating lug 42 can also have one or many appropriately shaped orientation lugs 42' which can be designed to mate with special cut out areas in the cookware fixing bracket 12 as shown in the top view of FIG. 3. FIG. 3 also shows a top view of the markings 44 which can be employed to be a food item locating queue.

FIG. 2 also shows that the photonic irradiation vectors 22 sometimes strike the comestible 32 but sometimes do not. As is shown by vector 24 which did not hit the food target item, it is able to pass straight through the narrowband cookware 41 and continue along a path. It is beyond the scope of this invention but a properly designed narrowband cooking system would employ properly designed reflectors to return or recycle the photons that do not hit the food target on the first pass so that it can be still absorbed into the food item.

The upward irradiation from array 20a and devices 21 is represented by the photonic vectors 22a which would be emanating from each of the devices 21 which is activated. The cookware 41 is on the path to the food target 32 but is designed to be transmissive at the wavelength that is being used for the narrowband cooking. As has been described elsewhere in this document, anti-reflective coatings can be used on one or both surfaces of cookware 41 to better match the refractive index of the cookware 41 to the air space 10 so that the photonic energy represented by 22a has the minimum reflection at the surfaces on its path through to the comestible 32.

It should be appreciated that the cookware 41 is shown as an integral, relatively homogenous unit; however, the cookware may take a variety of different forms. For example, the cookware 41 may have a cover or lid (e.g. that, in at least one form, is formed of a suitably optically transmissive material in accordance with the presently described embodiments) or may be formed of a metallic material acting as sidewalls while having optically transparent material on a bottom thereof. In a still further alternative, a metal rack having shoulders available for mating with the oven cavity may be provided with a suitable vessel according to the presently described embodiments supported therein.

Figure 4:
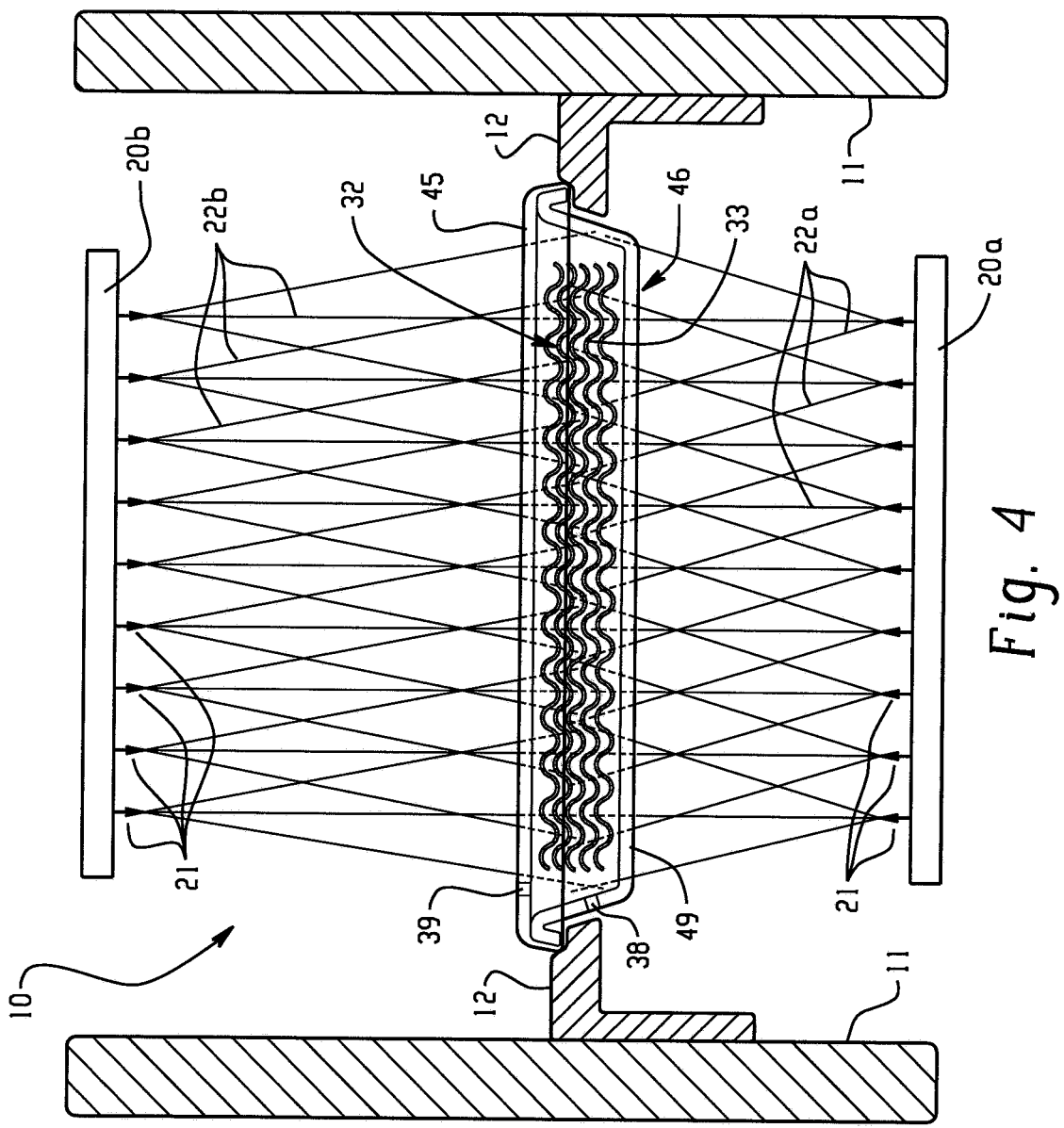
FIG. 4 is an illustration of an example vessel according to the presently described embodiments.

FIG. 4 shows a similar arrangement to FIG. 2 except that it is showing a thin wall plastic cook-pack 46 having a base portion 49 with a plastic cover 45. To illustrate the system according to the presently described embodiments, an oven cavity is shown. The base portion 49 and the cover 45 may take a variety of configurations, including those having ribs or apertures or compartments to separate items such as food items. Also, as shown, the edge of the base portion and/or cover may serve as a locating feature to mate with the shoulder 12 of the oven (in this and other described embodiments including those in FIGS. 5(a), 5(b), 6 and 7). Lugs or extensions may also be provided to the cook-pack or vessel to enhance positioning methods, although it is not required. The shoulder or bracket 12 may also be replaced with a rack or other mechanism to support the cook-pack, although optical transmissiveness of such a replacement mechanism may be a factor in achieving the presently described embodiments. In this case illustrated, energy is being irradiated from the upper array 20b as well the lower array 20a toward the comestible food item 33 and the photonic energy 22a and 22b passes through the transmissive structure of the cook-pack 46 including the cover 45 to irradiate or cook the food target 33. Also, if multiple comestible items or compartments are provided, techniques described in connection with FIG. 2 for heating or cooking multiple comestibles may be implemented. The plastic out of which the cook-pack 46 including the cover 45 is manufactured is specifically selected so that it is transmissive, as is described in more detail elsewhere in this document, by the narrowband irradiation that is characteristic of the narrowband cooking. Also, in one form, as an option, a pressure relief valve or opening may be provided to the lid or base portion, such as representatively shown at 39 or 38. Again, in at least one form, the contemplated narrow wavelength bands of irradiation emitted toward the comestible by the arrays match desired absorptive characteristics of the comestible being heated or cooked. In some forms, the cover 45 may not be used during the cooking/heating process and may take different forms, including those detailed below.

Figure 5A:
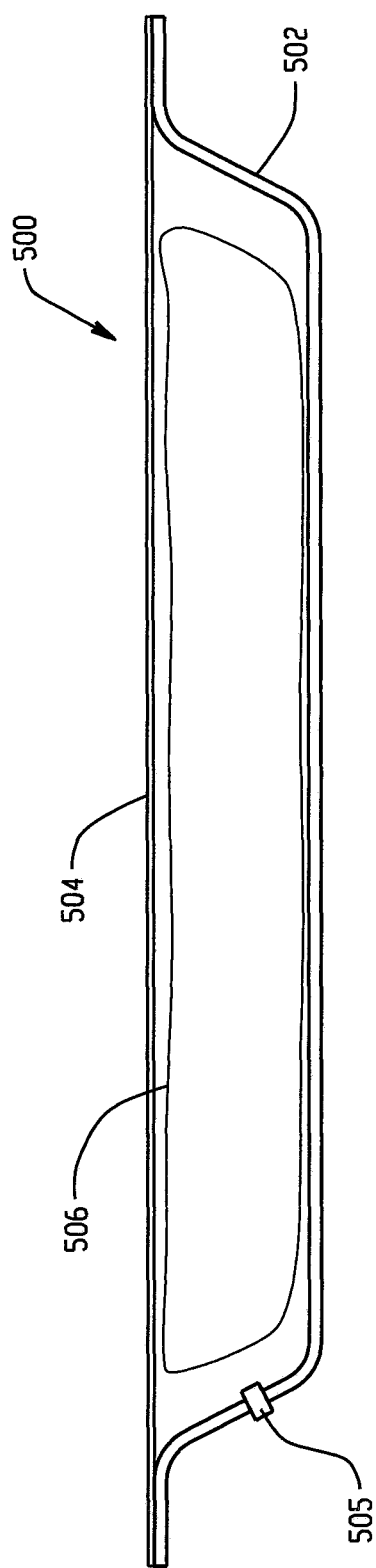
FIGS. 5(a) and (b) show illustrations of example vessels according to the presently described embodiments.

With reference to FIG. 5(a), an alternative cook-pack 500, storing comestible 506, is shown. An oven cavity is not shown for ease of illustration although the example cook-pack could be used in a system that heats or cooks as described in accordance with the presently described embodiments. In FIG. 5(a), the cook-pack 500 has a base portion 502 and a film cover 504, as opposed to a lid. The base portion 502 may take a variety of forms including those with ribs or apertures or compartments to separate items such as food items and may include, as an option, a pressure relief valve or opening 505. It should be appreciated that the film cover 504 is typically sealed to the base portion 502 but the film may be removed during cooking or heating in some cases. The plastic out of which the food-pack base portion 502 and film cover 504 is made has been specifically selected so that it is transmissive, as is described in more detail elsewhere in this document, by the narrowband irradiation that is characteristic of the narrowband cooking.

Figure 5B:
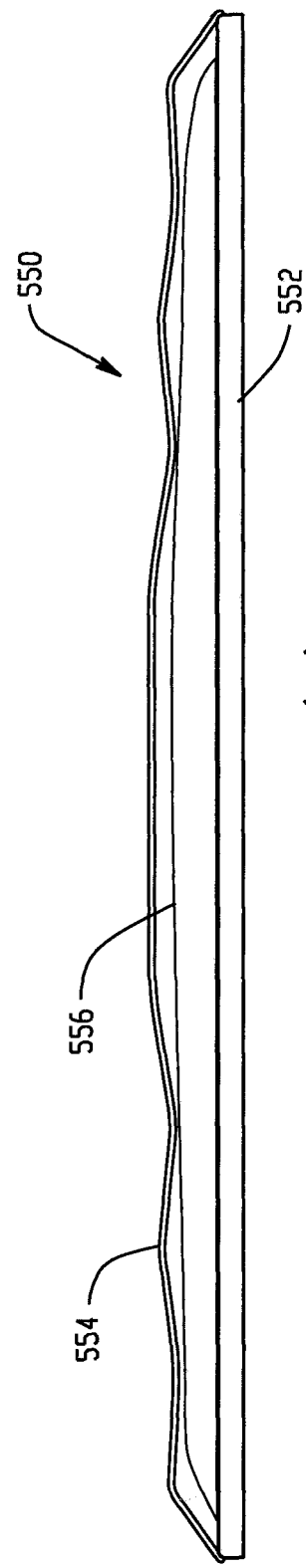

In FIG. 5(b), a further alternative cook-pack 550, storing comestible 556, is shown. Again, an oven cavity is not shown for ease of illustration although the example cook-pack could be used in a system that heats or cooks as described in accordance with the presently described embodiments. The cook-pack 550 includes a base portion 552 being substantially flat (e.g. no vertical walls). The base portion 552 may take a variety of forms, including that of a disc with apertures or holes (e.g. a mesh or mesh-like disc) or a disc with ribs therein. A film cover 554 is provided and, in some cases, may be removed during cooking or heating. The plastic out of which the food-pack base portion 552 and film cover 554 is made is, in at least one form, specifically selected so that it is transmissive, as is described in more detail elsewhere in this document, by the narrowband irradiation that is characteristic of the narrowband cooking.

It should be appreciated that the example cook-packs illustrated herein (e.g. cook-packs in FIGS. 4, 5(a), 5(b), 6 and 7) may take a variety of forms and include a variety of different combinations of the features noted herein (e.g. codes, colorants, . . . etc.). These cook-packs may also be used in the variety of manners described herein.

The cookware vessels and cook-packs according to the presently described embodiments may be manipulated at the preparation stage or cooking stage in unique manners. As such, FIG. 6 is a flow chart for a method for cooking using selected ones of the contemplated devices.

Figure 6:
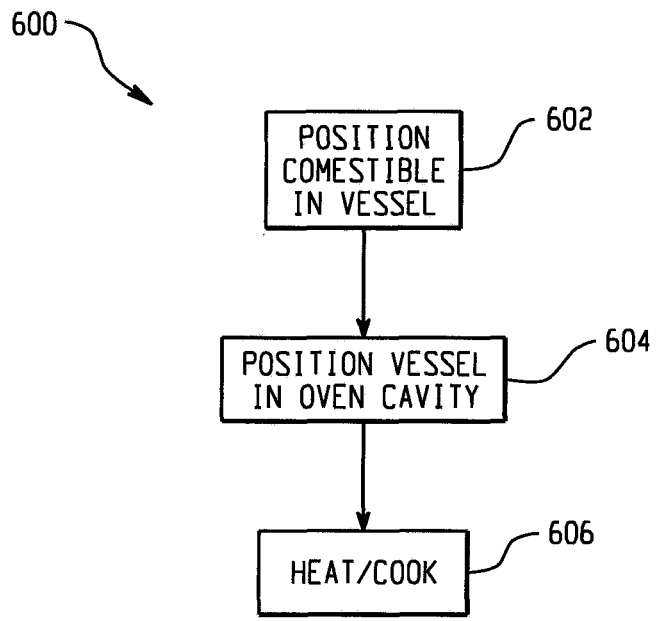
FIG. 6 is an illustration of an example method according to the presently described embodiments.

With reference to FIG. 6, a method 600 includes positioning a comestible in a vessel (or, in some cases, a cook-pack) (at 602). This may include use of the comestible guide features of the vessel noted above. The vessel is positioned in the oven cavity, e.g using the vessel location features above (at 604). Once the vessel is appropriately positioned relative to the arrays of the oven cavity, the heating or cooking process is conducted (at 606). As noted above, in at least some forms, the heating or cooking process may be accomplished using codes that are input or read.

Figure 7:
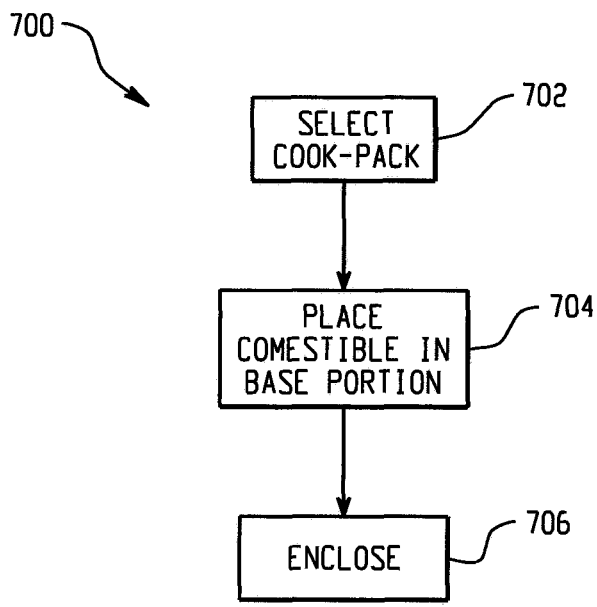
FIG. 7 is an illustration of an example method according to the presently described embodiments.

FIG. 7 illustrates a flow chart for preparing a cook-pack for later use in an oven cavity. In this regard, a method 700 includes selecting a suitable cook-pack (at 702). Of course, the cook-pack takes the form of those described herein. Accordingly, the method may also include the selection of a suitable material and manufacture or forming of a cook-pack having the characteristics described herein including being transmissive at the visible or infrared narrow wavelength bands of irradiation that are emitted by the arrays in accord with the presently described embodiments. As noted above, the cook-pack may also be provided or associated with special codes to enhance the cooking or heating process. The codes, in one form, are applied to, for example, the cook-pack (or its packaging or associated documentation) to be subsequently read by an oven or input to an oven. Also, as noted above, the cook-pack may have colorants therein. A comestible is placed in the base portion of a cook-pack (at 704). The comestible is then enclosed in the base portion (at 706). The enclosure may take a variety of forms, including a lid, a film or a box. It should also be understood that the cook-pack may then be provided to a consumer or user who will heat or cook the comestible using an appropriate oven as described in accord with the presently described embodiments.

It should be appreciated that the cook-pack selected is, in at least one form, to be a cook-pack that not only stores the comestible, but also is the same container or vessel in which the comestible is heated or cooked according to the presently described embodiments.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of heating a comestible item in an oven cavity, the oven cavity having irradiation arrays that emit visible or infrared irradiation at only desired narrow wavelength bands, the method comprising:
positioning the comestible in a vessel, the vessel being comprised of a material that is optically transmissive in at least one of the visible or infrared narrow wavelength bands of irradiation emitted by the irradiation arrays;
positioning the vessel in the oven cavity using a vessel location feature to locate the vessel in a predetermined position in the oven cavity relative to the arrays such that different comestible items are positioned based on markings or compartments in the vessel to correspond to different portions of the irradiation arrays; and,
heating the comestible in the vessel with irradiation emitted by the irradiation arrays.

2. The method as set forth in claim 1 wherein positioning the comestible in the vessel comprises using the markings which comprise a comestible guide feature to orient the comestible.

3. The method as set forth in claim 2 wherein the comestible guide feature comprises graphical indicators or geometric features on a bottom of the vessel.

4. The method as set forth in claim 1 wherein the vessel location feature comprises a shoulder positioned on the outside of the vessel, the shoulder being configured to mate with a portion of the oven cavity to hold and locate the vessel within the oven cavity.

5. The method as set forth in claim 1 wherein positioning the vessel in the oven cavity using a vessel location feature to locate the vessel in a predetermined position in the oven cavity relative to the arrays comprises the vessel mating with a support structure built into or attached to an inside of the oven cavity such that the support structure supports the vessel having a comestible therein in a correct cooking position.

6. The method as set forth in claim 1 wherein the narrow wavelength bands of irradiation are at least one of less than 50 nanometers, less than 10 nanometers or approximately 1 nanometer in width.

7. The method as set forth in claim 1 wherein the heating is based on programmable control of the irradiation arrays.

8. The method as set forth in claim 1 wherein the heating comprises heating the different comestible items selectively using differing irradiation for the different comestible items.

9. A method of heating a comestible item in a vessel or cook-pack in an oven cavity, the oven cavity having irradiation arrays that emit visible or infrared irradiation at only desired narrow wavelength bands and the vessel or cook-pack being comprised of a material that is optically transmissive in at least one of the visible or infrared narrow wavelength bands of irradiation emitted by the irradiation arrays, the method comprising:
   positioning the vessel or cook-pack in the oven cavity using a location feature to locate the vessel or cook-pack in a predetermined position in the oven cavity relative to the arrays such that different comestible items are positioned based on markings or compartments in the vessel or cook-pack to correspond to different portions of the irradiation arrays; and,
   heating the comestible in the vessel or cook-pack with irradiation emitted by the irradiation arrays.

10. The method as set forth in claim 9 wherein the comestible is positioned in the vessel or cook-pack based on the markings which comprise a comestible guide feature to orient the comestible.

11. The method as set forth in claim 10 wherein the comestible guide feature comprises graphical indicators or geometric features on a bottom of the vessel or cook-pack.

12. The method as set forth in claim 9 wherein the location feature comprises a shoulder positioned on the outside of the vessel or cook-pack, the shoulder being configured to mate with a portion of the oven cavity to hold and locate the vessel or cook-pack within the oven cavity.

13. The method as set forth in claim 9 wherein positioning the vessel or cook-pack in the oven cavity using a location feature to locate the vessel or cook-pack in a predetermined position in the oven cavity relative to the arrays comprises the vessel or cook-pack mating with a support structure built into or attached to an inside of the oven cavity such that the support structure supports the vessel or cook-pack having a comestible therein in a correct cooking position.

14. The method as set forth in claim 9 wherein the heating comprises heating the different comestible items selectively using differing irradiation for the different comestible items.

15. The method as set forth in claim 9 wherein the narrow wavelength bands of irradiation are at least one of less than 50 nanometers, less than 10 nanometers or approximately 1 nanometer in width.

16. The method as set forth in claim 9 wherein the heating is based on programmable control of the irradiation arrays.

17. A method of heating a comestible item in a vessel or cook-pack in an oven cavity, the oven cavity having irradiation arrays that emit visible or infrared irradiation at only desired narrow wavelength bands and the vessel or cook-pack being comprised of a material that is optically transmissive in at least one of the visible or infrared narrow wavelength bands of irradiation emitted by the irradiation arrays, the method comprising:
   positioning the vessel or cook-pack in the oven cavity using a location feature to locate the vessel or cook-pack in a predetermined position in the oven cavity relative to the arrays such that different comestible items are positioned to correspond to different portions of the irradiation arrays; and,
   heating the comestible in the vessel or cook-pack with irradiation emitted by the irradiation arrays, the heating comprising heating the different comestible items selectively using differing irradiation for the different comestible items based on programmable control of the irradiation arrays.

18. The method as set forth in claim 17 wherein the comestible is positioned in the vessel or cook-pack based on the markings which comprise a comestible guide feature to orient the comestible.

19. The method as set forth in claim 18 wherein the comestible guide feature comprises graphical indicators or geometric features on a bottom of the vessel or cook-pack.

20. The method as set forth in claim 17 wherein the location feature comprises a shoulder positioned on the outside of the vessel or cook-pack, the shoulder being configured to mate with a portion of the oven cavity to hold and locate the vessel or cook-pack within the oven cavity.

21. The method as set forth in claim 17 wherein positioning the vessel or cook-pack in the oven cavity using a location feature to locate the vessel or cook-pack in a predetermined position in the oven cavity relative to the arrays comprises the vessel or cook-pack mating with a support structure built into or attached to an inside of the oven cavity such that the support structure supports the vessel or cook-pack having a comestible therein in a correct cooking position.

22. The method as set forth in claim 17 wherein the narrow wavelength bands of irradiation are at least one of less than 50 nanometers, less than 10 nanometers or approximately 1 nanometer in width.

\* \* \* \* \*